Jan. 14, 1969 J. EISENBACH 3,421,682

PACKAGING CONSISTING OF THERMOPLASTIC FOIL

Filed March 17, 1967 Sheet 1 of 2

INVENTOR
JOACHIM EISENBACH
BY
ATTORNEY

FIG. 4
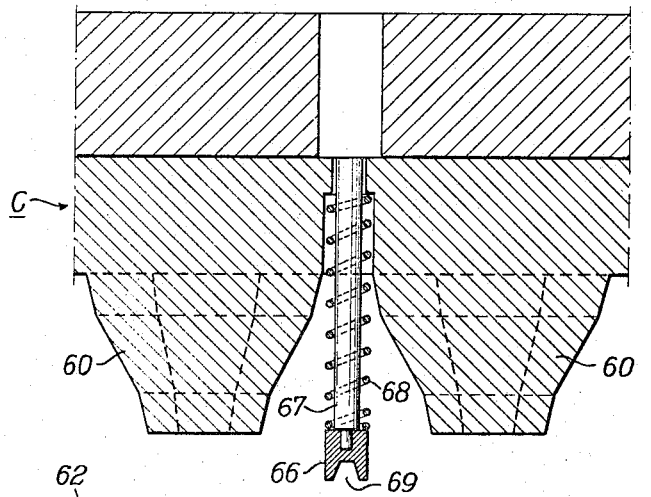
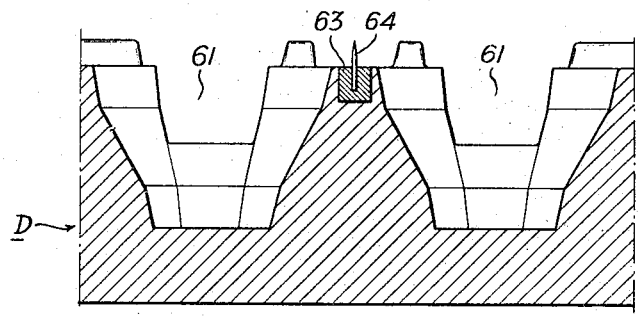
FIG. 5
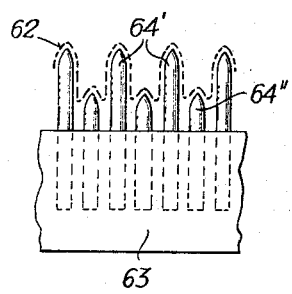
FIG. 6
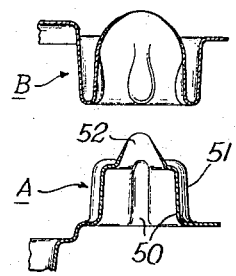
FIG. 7
INVENTOR
JOACHIM EISENBACH
BY
ATTORNEY United States Patent Office 3,421,682
Patented Jan. 14, 1969

3,421,682
PACKAGING CONSISTING OF THERMOPLASTIC FOIL
Joachim Eisenbach, Nikolaihofgasse 4, Klosterneuburg, Austria
Filed Mar. 17, 1967, Ser. No. 624,088
Claims priority, application Austria, Mar. 25, 1966, A 2,859/66
U.S. Cl. 229—51                           2 Claims
Int. Cl. B65d 17/00

ABSTRACT OF THE DISCLOSURE

This invention relates to packaging formed of thermoplastic foil, and particularly but not exclusively to packaging of the type which can be used to accommodate eggs, fruit or piecetype articles.

---

Figure 1:
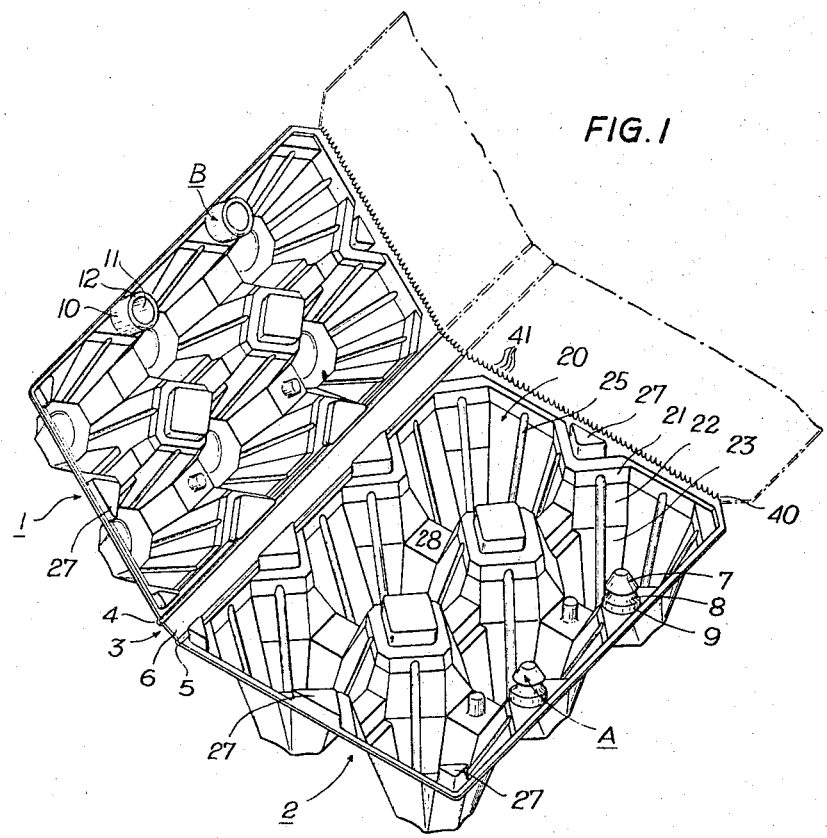

The invention consists of a packaging formed of themoplastic foil having at least one weakening line along which the packaging can be divided into a number of parts, said weakening line comprising a row of closely spaced elevations all extending in one direction from the plane of the foil and each terminating in a point to represent an incomplete perforation of the foil.

More specifically, the packaging consists of two substantially alike halves, with insert recesses for the articles to be packaged, joined by a web. A package so formed can be sealed by connecting means, for example, by projections interengaging in the manner of a press-stud.

Hitherto such packagings have been produced in units of different sizes according to requirements, for example, they have been designed to contain six, ten or twelve articles. Accordingly a purchaser is compelled to buy in units of a certain size, and further, a dealer has to keep a stock of these different-sized units.

An object of the present invention is to replace different sizes of such packagings by a single size unit, while retaining the possibility of offering different packed quantities of articles to the purchaser as desired, for example, two, three, six or ten eggs.

It also affords a dealer the possibility of being able to keep in stock a uniform packaging yet which, according to requirements, can be filled with two, four, six and so on articles.

With packagings formed from paper fibre slurry it has already been proposed to connect two closed packaging units each with six eggs together at one edge and to provide at the point of connection a row of notches, holes or perforations, which facilitate separation. However this form of packaging and the material used do not permit the detaching of for example, a single egg with its packaging.

With packagings formed from thermoplastic material which are more advantageous than mechanical wood pulp packagings in many respects, it is not easily possible to effect a clean separation along a weakening line or perforations, because the rigidity of the fibre molecule of which the plastic material consists, differs in different directions. Tearing across the fibre molecules orientated by the stretching of the foil is almost impossible. However along the direction of the orientation of these molecules separation by tearing is very easy to effect.

A further object of the invention is therefore to facilitate a separation or opening of a packaging formed of plastics material into two or more parts by intended orientation of the fibre molecules in the desired direction of separation. It should be emphasized that this problem not only arises in the production of packagings, for eggs, fruit or the like, separable into two or more parts, but frequently arises in the case where a part of a foil of plastic material is to be separated from another part along a line.

According to the invention there is provided a packaging formed of thermoplastic foil, particularly a packaging for individual articles such as eggs or fruit, having at least one weakening line along which the packaging can be divided into a number of parts, said weakening line comprising a row of closely spaced elevations all extending in one direction from the plane of the foil and each terminating in a point to represent an incomplete perforation of the foil.

The preferred line along which the packaging is to be opened or separated, runs precisely in the direction of the pin points forming the weakening line, that is to say where the desired orientation of the fibre molecules reaches its maximum.

The invention also provides a method of producing a packaging, particularly a packaging for individual articles such as eggs or fruit, having at least one weakening line along which the packaging can be divided into a number of parts, comprising clamping a heated foil at both sides of the required weakening line, so that the region of the weakening line is isolated from any molecular orientation effect due to shaping of the foil, and forming along said weakening line a row of closely spaced elevations while avoiding complete perforation of the foil, whereby the molecules in the region of the weakening line are orientated along the weakening line.

Once the reorientation of the fibre molecules has been effected, there is no trouble in ripping open the packaging along the weakening line and the tearing observed hitherto across the weakening line is obviated.

The invention also provides a device for forming a packaging of thermoplastic foil, particularly a packaging for individual articles such as eggs or fruit, having at least one weakening line along which the packaging can be divided into a number of parts, comprising a mould of at least two parts for forming a heated foil into a packaging, one part of said mould carrying a hold-down plate having spaced holding surfaces arranged to clamp the heated foil during closing of the mould parts, and the other part of the mould carrying a tool arranged to form a row of closely spaced elevations along the region of the foil between said spaced holding surfaces while avoiding complete perforation of the foil, the hold-down plate and/or the tool being resiliently movable in relation to the mould.

Hold-down plates and the tools are arranged at all points at which a weakening line is to be obtained on the packaging.

The fibre molecules of the heated foil of plastics material have as mentioned a different orientation to each other, which they receive in the stretching of the foil during production. If it is attempted to tear such a foil, then this can only occur along the molecules extending in different directions, that is along the line of least resistance and therefore mostly transversely to the intended direction. However when a hold-down plate holds the material fast at both sides of the intended groove as in the present invention, the region between the hold-down surfaces is freed from extraneous influence so that the needles in sinking into the foil produce, by stretching of the material around each needle point, a definite reorientation of the fibre molecules in the direction of the intended weakening line. The material lying around the penetrating points is thereby stretched and at least a major part of the molecules lying around the needle points are reorientated so that separation of the material parallel to the direction of the molecules, that is, along the intended weakening line, no longer presents any difficulty.

Figure 2:
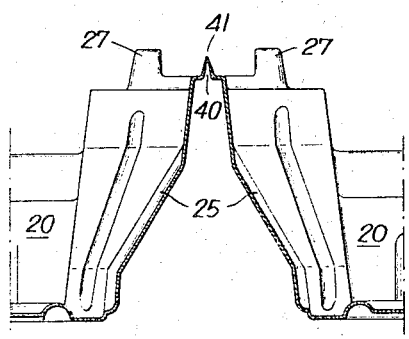
Figure 3:
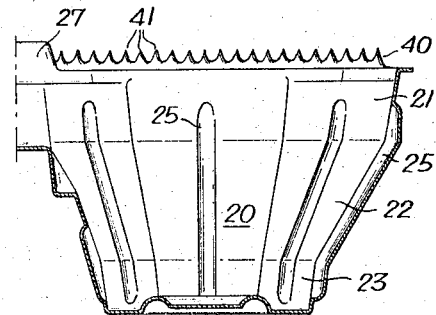

The invention will now be described by way of example with reference to the accompanying drawings, in which:

FIGURE 1 shows a perspective view of an already separated packaging embodying the invention, FIGURE 2 shows a partial longitudinal section of the packaging shown in FIGURE 1 to an enlarged scale, FIGURE 3 shows a partial cross-section along a weakening line of the packaging shown in FIGURE 1, to an enlarged scale, FIGURE 4 shows in cross-section a device for carrying out the method of the invention, FIGURE 5 shows a part of the device shown in FIGURE 4, and FIGURES 6 and 7 show a modified closure for the packaging shown in FIGURES 1 to 3.

In the embodiment shown, the packaging consists of two similar halves 1 and 2 which are connected to each other by a web 3 forming a kind of hinge. The packaging is therefore in one piece, that is to say that all parts formed in the course of production by deep drawing a plastic material foil are formed from the said foil in one operation. The example shown can accommodate six articles but similar packagings can be produced with eight, ten or more depressions and made according to the invention, that is to say divided by weakening lines transversely between the insert depressions.

The web 3 has two folds 4, 5, which bound a flat centre strip 6. The latter can serve advantageously for the application of firms' names, information concerning the quality of the articles contained and the like.

At the edges of the two halves 1, 2 remote from the web 3 there are arranged protuberances or projections A, B obtained by deep-drawing, which, when the packaging is closed, interengage in pairs in the manner of a press-stud.

In the example shown on projection A has a truncated cone 7, which is separated from a base part 9 by an annular groove 8. This annular groove 8 represents therefore an undercut of the surface of the projection, which on closing the packaging has the function of detachably fastening the edges of the two halves of the packaging.

The projection B provided at the other edge and co-operating with the projection A is a hollow cylinder 10 with a smaller taper, which has at its upper part a circular opening 11 bounded by a flange 12 extending radially inwards. The inner diameter of the flange 12 corresponds to that of the annular groove 8, but is rather smaller, and is in any case smaller than the largest diameter of the cone 7.

On interengagement of the two projections A, B the flange 12 is deformed somewhat and rests in the annular groove 8 and the cone 7 is accommodated in the hollow space of the cylinder 10. Therefore only a light pull or push on the edges of the halves 1, 2 is required to open or close, respectively, the packaging, although the fastening is completely sufficient to prevent any undesirable opening of the package. The packaging may be opened and closed as often as desired without altering the firmness of the fastening.

In FIGURES 6 and 7 there is shown a modified construction of the press-stud closure, in which the projection A has four longitudinally extending grooves 50, which separate four inwardly resiliently flexible webs 51.

The projection B consists, as in FIGURE 1, of a hollow cylinder, which in this case however is double walled.

Upon closure of the packaging a projection A with webs 51 penetrates the interior of each hollow cylinder-like projection B and causes a frictional contact on its inner wall. It is important in this respect that this frictional contact is achieved at numerous points along the extent of the web, with the result that the closure leaves a more or less large gap between the halves 1, 2 of the packaging.

In this way an adaptation to articles of different sizes is possible, this adaptation occurring automatically on closing the packaging.

Moreover, as can be seen from the drawing, the projection A carries a central extension in the form of a truncated cone, which ensures the insertion of the projection A into the interior of the projection B even with slightly deformed specimens.

The embodiment represented in FIGURES 1 to 3 of the drawing has insert depressions 20, which are formed by truncated cones 21, 22, 23 one developing into another.

When the packaging is closed there are formed in the present case six individual double troughs, which on the outside form protuberances and make possible for example to accommodate six eggs. The individual eggs are thus supported at the walls of the central truncated cone 22. As can be further seen from the drawing, there are formed, on the envelope of the insert recesses, projections or inwardly directed ridges 25, which hold the inserted egg flexibly and resiliently.

On the three open edges of the packaging there are arranged further projections 27, which position the two halves 1, 2 of the packaging in co-operation with the web 3 or with the closure projections A, B. Also between the insert depressions or protuberances arranged in known maner at the corners of a square there are provided projections 28, which, when the packaging is closed come to rest on each other.

The packaging can be stacked with the interengagement of the protuberances, that is practically without space in between. If a multiplicity of packagings are arranged side by side in one plane, then it is possible for a uniform layer of such packagings, preferably rotated through 90° in their layer plane, to be stacked with interengagement of the protuberances, and can thus be packed to be despatched in cases.

In accordance with the invention two of the packagings parts shown in FIGURE 1 are joined by a weakening line 40, as indicated in FIGURE 3. The weakening line 40 is formed by needle-like elevations terminating in a closed tip 41, which are spaced apart by a distance of about 2.5 mm., and have a height of about 2.5 mm. and a diameter of about 2 mm. They are formed by allowing the heated plastic material foil to flow over needles which are fastened in the deep draw mould. Between the tips 41 there are formed webs, which should have as uniform a depth as possible. All needle-like tips are divided into two symmetrical halves on separation of the packaging. The indicated dimensions of the elevations can of course be varied depending on the thickness of the plastics material foil.

On each side of the elevations there is provided a strip, which is held fast by a hold-down plate while the needles are sunk into the foil, in order to effect the intended reorientation of the fibre molecules.

An embodiment of a deep draw mould, as it can be used for producing the weakening line, of incomplete perforations, is shown diagrammatically in FIGURES 4 and 5.

The mould comprises two parts C and D which are movable in relation to one another, and have protuberances 60 which engage in conjugate depressions 61 and thus form the complete foil 62. At the desired separation line there is provided at the lower part, a tool consisting of a fillet 63, in which there is fixed a row of needles 64 arranged close to each other. As can be seen from FIGURE 5, needles 64' and needles 64'' of different lengths are arranged alternately, to prevent the hot foil in the region of the needles reaching down to the level of the mould, as otherwise there is the danger that the walls of the web formed between the points become welded together.

A hold-down plate 66 is resiliently arranged at the upper part C of the mould, it being fastened to a retractable pin 67 with interposition of a compression spring 68.

The hold-down plate 66 is formed as a rail with a recess 69, which is conical in cross section, with which the needles engage during the closure of the mould. Since the hold-down plate is positioned at the needle fillet by the action of vacuum or compressed air before the closure of the mould and thus before the complete forming of the hot foil, it holds the foil on both sides of the row of needles along parallel strips, to cause reorientation of the fibre molecules to take place, whilst the foil is positioned round the needle tips. There is effected therefore the forming of the foil inside and outside the hold-down plate independently of one another, with the effect that the drawing of the foil over the tips of the needles and the application on the needles induces re-orientation of the fibre molecules, while remaining unaffected by the drawing process on the material outside of the boundary of the hold-down plate, which forms the remaining part of the packaging.

I claim:

1. A packaging formed of thermoplastic foil for individual articles such as eggs or fruit, having at least one weakening line extending across the packaging and along which the packaging can be divided into two parts, said weakening line comprising a row of closely spaced hollow needle-like elevations open at the bottom and closed at the top and all extending in one direction from the plane of the foil thereby permitting separation by applying force in the direction of the row of elevations.

2. A packaging as claimed in claim 1 wherein said elevations are of needle-like shape.

References Cited

UNITED STATES PATENTS

| | | | |
|---|---|---|---|
| 2,955,736 | 10/1960 | Annen | 229—51 |
| 3,045,891 | 7/1962 | Alvarez | 229—69 |
| 3,351,270 | 11/1967 | Hohnjec. | |

DAVID M. BOCKENEK, *Primary Examiner.*

U.S. Cl. X.R.

229—2.5, 44